Nov. 8, 1955     C. A. RIGNELL     2,722,883
CHARCOAL BROILER
Filed May 23, 1951     2 Sheets-Sheet 1
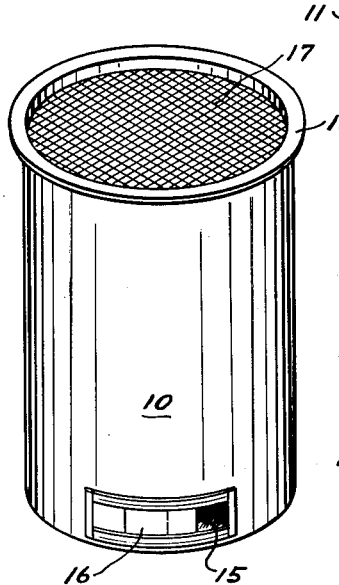
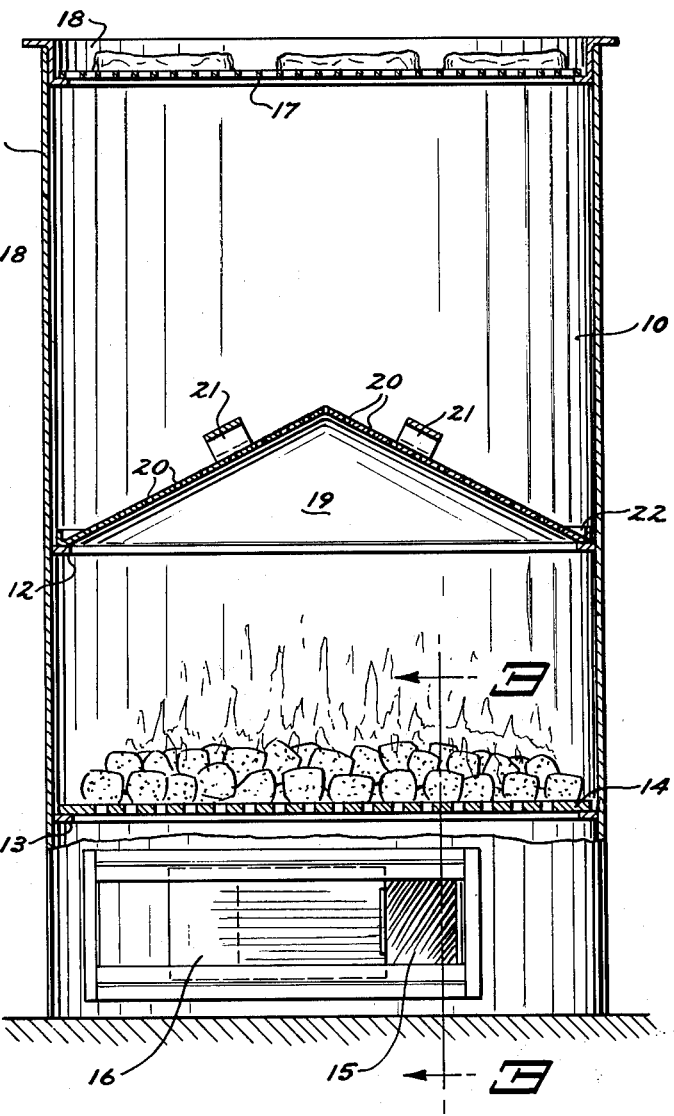
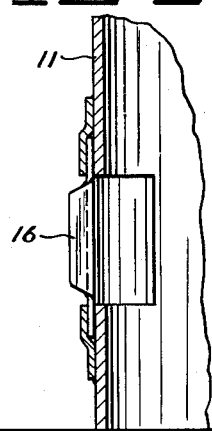
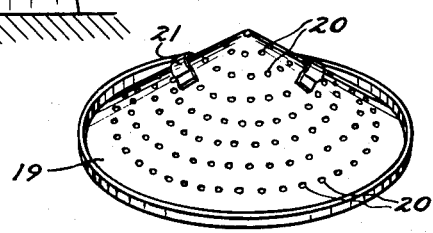
INVENTOR.
CARL A. RIGNELL
BY
G. H. Braddock
ATTORNEY Nov. 8, 1955  C. A. RIGNELL  2,722,883
CHARCOAL BROILER Filed May 23, 1951  2 Sheets-Sheet 2

INVENTOR.
CARL A. RIGNELL
BY
G. H. Braddock
ATTORNEY

United States Patent Office 2,722,883
Patented Nov. 8, 1955

2,722,883
CHARCOAL BROILER
Carl A. Rignell, Linwood Township, Anoka County, Minn.
Application May 23, 1951, Serial No. 227,907
3 Claims. (Cl. 99—447)

This invention has relation to charcoal broilers of the type used to cook foods in the out-of-doors.

A charcoal broiler made according to the present invention has a grease intercepter which eliminates the flare up caused when the juices and fats drop from the food being cooked into the fire.

A broiler of the invention will cause meats or other foods therein to be subjected to great heat over all parts thereof. The amount of this heat will be readily controlled and regulated through the use of a manually operable draft opening. The gases arising from the charcoal fire will be brought in contact with all parts of the meat or other food being cooked and will cause a distinctive and desirable flavor to be imparted thereto.

In the accompanying drawings forming a part of this specification:

Fig. 1 is a pictorial view of a first form of the invention;

Fig. 2 is a side elevational view partially in full and partially broken away;

Fig. 3 is a fragmentary sectional view taken on the line 3—3 in Fig. 2;

Fig. 4 is a pictorial view showing the grease intercepter of the first form of the invention;

Figure 5:
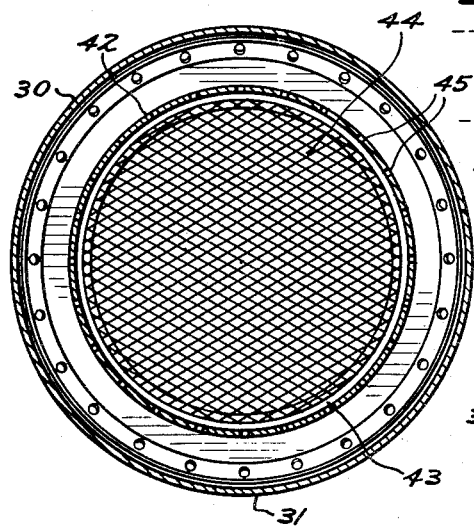
Fig. 5 is a side elevational view of a second form of the invention partially in full and partially broken away.

A first form of the invention is shown in Figs. 1, 2, 3 and 4. A charcoal burner is denoted 10. It consists of an upright open ended cylindrical shell 11 which has an interiorly extending annular supporting flange 12 integral therewith in a central portion thereof and an interiorly extending annular supporting flange 13 integral therewith at a lower portion thereof. A circular grate 14 has a diameter larger than the inner diameter of said lower flange 13 and rests thereon.

A portion of the upright cylindrical shell 11 below the lower supporting flange 13 has been removed to provide a draft opening 15 which may be covered or uncovered by manipulation of a sliding draft door 16. This door 16 is held in place and supported by suitable slides and stops. A grid iron or grill 17 upon which meat or other foods to be broiled are placed is supported in an upper portion of said shell 11 by a shallow bottomless pan member 18.

A circular grease intercepter 19 is of diameter slightly larger than the inner diameter of the supporting ring 12 and rests thereon. It is made of relatively thin heat conducting material and is provided with a plurality of holes 20 through which the hot gases from the charcoal fire can freely pass. A pair of handles 21, 21 are attached to the upper surface of the intercepter and are for the purpose of removing the intercepter from and the installation of the intercepter in to the cylindrical shell 11. An annular upstanding lip 22 is provided at the outer end of the intercepter 19. As disclosed, the intercepter is cone shape, but could be of many other configurations.

To prepare the broiler for operation, the grid iron 17 and the supporting pan 18 are removed, the grease intercepter is lifted out of the upright cylindrical shell, and a layer of charcoal is spread on the grate 14. The grease intercepter 19 and the grid iron 17 can then be replaced. While the charcoal could be ignited through the top of the shell 11 before replacing these elements, a preferred method is to ignite some suitable kindling agent such as crumpled newspaper or a portion of waxed carton. This kindling agent can then be introduced through the draft hole 15 to position under the grate or the entire burner can be lifted or tilted to facilitate putting the kindling agent through the open lower end of the shell 11. The draft door 16 will, of course, be located to permit sufficient draft to cause the charcoal to become readily ignited. After the charcoal has become ignited, the heat therefrom will cause the grease intercepter to become heated. When this condition has been reached the meat to be broiled will be put on the grid iron. As is common in broiling operations, the heat from below will tend to sear the surface of the meat and so prevent excess loss of the juices, and fats therefrom. A certain amount of juices and fats will, however, be caused by the heat to drop from the meat through the grid iron toward the fire. In a conventional charcoal broiler, this grease falls directly into the fire and causes a flare up which will often result in the flames therefrom reaching much higher than the grid iron and the meat thereon. This results in burning of the meat and, in the event that the meat is being tended, often results in burned fingers.

In the present invention the grease will come in contact with the grease intercepter and will be immediately turned into vapor to rise again in the form of gases and vapor to pass through the grid iron. In the event that the broiler is used before the intercepter reaches maximum temperature, the grease may not all be instantaneously vaporized and some may run down the sides of the intercepter. The grease will be collected between the lip 22 and the main body of the intercepter and will remain there until the heat generated by the charcoal below is sufficient to drive it off in the form of gases and vapor.

It has been found that the gases and vapor from the charcoal fire passing upward through the openings 20 in the intercepter and the heating and vaporizing effect of the heated grease intercepter itself effectively prevent any amount of grease sufficient to cause flare up from passing through the intercepter openings 20 and reaching the fire. Throughout the broiling operation, it is possible to control the degree of heat reaching the grid iron by controlling the draft door 16 to restrict the amount of air passing through the draft opening 15. The presence of the grease intercepter between the grid iron and the grate serves to control the application of heat to the meat being cooked. Because of the diffusion effect of the intercepter the meat is heated more uniformly and searing and burning directly over the center of the fire is thus avoided. Should the need for broiled meat temporarily cease, it is possible to hold the fire in the broiler in readiness to resume cooking with minimum loss of charcoal by closing the draft door 16 completely and thereby greatly reducing the amount of heat coming from the charcoal fire. The fire may be extinguished by cutting off the draft from below, and by laying an air tight cover across the top of the shell 11 or across the top of the grid iron supporting member 18.

Figure 6:
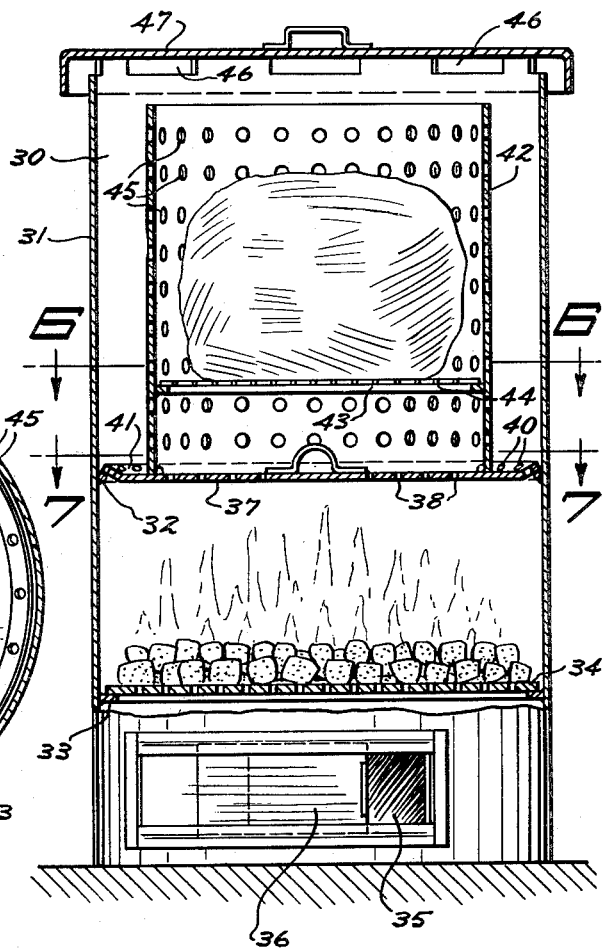
Fig. 6 is a sectional view taken on the line 6—6 in Fig. 5.
Figure 7:
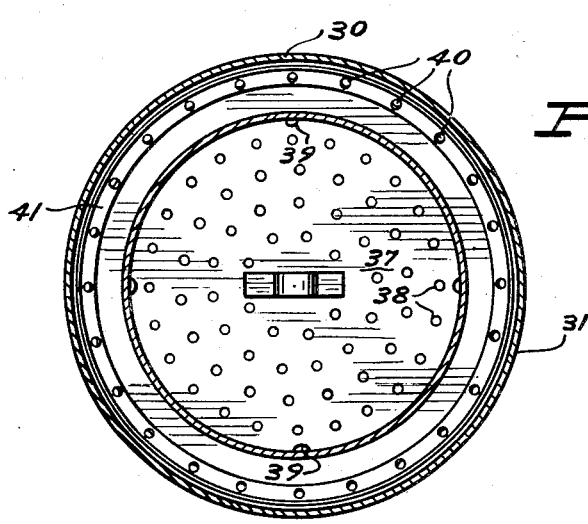
Fig. 7 is a sectional view taken on the line 7—7 in Fig. 5.

A broiler made according to a second form of the invention is denoted 30 and is shown in Figs. 5, 6 and 7. It consists of an upright cylindrical shell 31 open at both ends and having an upper supporting flange 32 integral therewith and extending inwardly from a central portion thereof, and a lower supporting flange 33 integral therewith and extending inwardly therefrom at a lower portion thereof. A grate 34 rests on the lower flange 33. The upright cylindrical shell 31 is provided with a draft opening 35 which is controlled by a manually operable draft door 36. A grease intercepter 37 is supported on the upper annular flange 32. Said intercepter 37 is provided with a series of holes 38 at a central portion thereof and with a plurality of positioning lugs 39 located on a circle arc concentric with the outer edge of the intercepter and passing outside of the location of all of the holes 38. A series of holes 40 are provided in a portion of said intercepter exterior of a circle passing through said positioning lugs. The outer edge of the intercepter is turned upward to form a lip 41. An open ended upright inner cylindrical supporting member 42 rests on the grease intercepter, is concentric with the upright cylindrical shell and is retained in this position by the positioning lugs 39. An integral flange 43 extends interiorly of said supporting member 42 near one end thereof.

A grid iron 44 is so constructed as to fit on and to be supported by said supporting flange 43. A plurality of holes 45 are provided in the cylindrical supporting member 42. A series of slots 46 are provided in the top edge of the shell 31 and a cover 47 rests on the top edge of said upright shell.

As in the case of the first form of the invention, a grease intercepter and the removable elements above it are taken out of the upright cylindrical shell 31 to load the broiler with charcoal. A fire will be kindled in the manner previously described in connection with the first form of the invention.

In the event that the broiler is to be used to cook meats which are relatively thin such as pork chops and hamburgers, the cylindrical supporting member 42 will be set in place so that the supporting flange 43 is nearest the top thereof. The grid iron 44 will then be placed on flange 43 and the action of the broiler will be substantially the same as that described in the first form of the invention. It will not be necessary to utilize the cover for this type of broiling. In the event that a larger piece of meat, for example a roast, is to be broiled, the cylindrical supporting member 42 will be so positioned that the supporting flange 43 is nearest the bottom thereof and the grid iron 44 will then be placed thereon. The meat to be broiled will be placed in position similar to that disclosed in Fig. 5 and the cover will be put in place. As the heat comes up through the grease intercepter, it will be caused to circulate through the holes 38 and 40 thereof, through the holes 45 in the supporting member 42 and will therefore come in contact with all surfaces of the meat to be broiled. This will effect substantially equal cooking on all sides of the meat and will cause the sought after charcoal flavor to be imparted to all portions.

The cover 46 acts as a deterrent to the passage of heat and the vapor and gases from the fire and so aids in the distribution of heat to all portions of the meat. The fumes, gases and some of the heat will ultimately pass out of the slots 46.

In this second form of the invention, the action of the grease intercepter will be the same as in the first form. Grease, fats and juices which fall from the meat being cooked when the cylindrical supporting member 42 is in either of its positions will impinge on the grease intercepter and will be vaporized thereby. Gases passing upward through the openings 38 inside of the cylindrical supporting member 40 and the heat of the intercepter will prevent passage of grease from meat being broiled from the area above the intercepter to the fire in sufficient quantities to cause flare up.

What is claimed is:

1. In a charcoal broiler, the combination of an upright cylindrical shell, draft regulating means for controlling the amount of air entering a lower portion of said shell, a grate, a grease intercepter extending across said shell vertically above said grate and having a plurality of equally spaced openings therethrough, an upright cylindrical supporting member resting on said grease intercepter and having a plurality of equally spaced openings therethrough, a grid iron supported in said upright member, means for restricting the flow of air, gases and vapor in said broiler including a cover supported over an upper end of said upright cylindrical shell.

2. In a charcoal broiler, an upright shell, means for regulating the amount of air entering a lower portion of said shell, a grate supporting said shell above said air regulating means, a grease intercepter extending across said shell vertically above said grate, said grease intercepter consisting of a relatively thin heat conducting member having openings therethrough and having an upturned lip at the periphery thereof positioned adjacent the interior wall of said upright shell, an interior upright supporting member adapted to fit inside said shell in spaced relation thereto, a grid iron adapted to be supported by said supporting member, and supporting means integral with said supporting member adjacent a first end of said supporting member for supporting said grid iron in position spaced from and relatively close to said grease intercepter when said first end of said supporting member is in contact with said grease intercepter and for supporting said grid iron spaced from and relatively far away from said grease intercepter when a second end of said supporting member is in contact with said grease intercepter.

3. In a charcoal broiler, the combination of an upright shell, draft regulating means for controlling the amount of air entering a lower portion of said shell, a grate, a grease intercepter extending across said shell vertically above said grate and having a plurality of equally spaced openings therethrough, an upright supporting member resting on said grease intercepter and having a plurality of equally spaced openings therethrough and a grid iron supported in said upright member.

References Cited in the file of this patent

UNITED STATES PATENTS

| Number | Name | Date |
| --- | --- | --- |
| 365,915 | Fowble | July 5, 1887 |
| 1,563,823 | Anderson | Dec. 1, 1925 |
| 1,725,521 | Keiner | Aug. 20, 1929 |
| 1,862,420 | O'Brien | June 7, 1932 |
| 1,896,192 | Cain | Feb. 7, 1933 |
| 1,956,387 | Hartman | Apr. 24, 1934 |
| 2,099,788 | Ames | Nov. 23, 1937 |
| 2,143,602 | Johnson | Jan. 10, 1939 |
| 2,558,569 | Koch | June 26, 1951 |